Patented Sept. 3, 1946

2,407,044

UNITED STATES PATENT OFFICE 2,407,044

MANUFACTURE OF PHENOLS

Daniel Tyrer, Stockton-on-Tees, England

No Drawing. Application April 6, 1943, Serial No. 482,065. In Great Britain March 31, 1942

5 Claims. (Cl. 260—628)

This invention relates to the manufacture of phenols from salts of mono sulphonic acids.

The customary process for the manufacture of phenol from benzene sulphonic acid involves fusing the sodium salt of benzene sulphonic acid with caustic soda at a temperature of 300–350° C. The reaction may be represented by the equation:

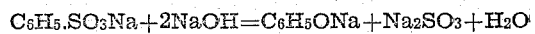

$$C_6H_5.SO_3Na + 2NaOH = C_6H_5ONa + Na_2SO_3 + H_2O$$

The product is dissolved in water and the phenol is recovered by treating the sodium phenate with a suitable acid. However, this process is somewhat expensive owing to the cost of the caustic alkali, and to the fact that the latter has to be used in an amount considerably in excess of the theoretical quantity.

An object of the present invention is to provide a simple, less costly and efficient process for the manufacture of phenols from mono-sulphonic acids in good yield with the aid of calcium hydroxide or other inorganic base, instead of caustic alkali.

It has been proposed to manufacture phenols by heating a mixture of a sulphonate corresponding with the phenol desired and calcium hydroxide to form the calcium phenate, and then liberating the phenol by decomposing the phenate in a current of steam containing an acidic dioxide gas, such as sulphur dioxide or carbon dioxide, capable of reacting with the phenate. However, at the high temperature of 425–500° C. required in this process there is a considerable formation of undesired by-products.

I have unexpectedly found that the mono-sulphonic acid salts, which are convertible by the exchange of sulpho-groups for hydroxyl groups into "phenols" as hereinafter defined, slowly decompose when heated alone in steam at 400–500° C. to yield the corresponding free phenol with the liberation of sulphur dioxide. I have further discovered that this decomposition is greatly accelerated by the presence of an inorganic base, such as calcium hydroxide, which is infusible at the reaction temperature and is capable of forming with the liberated sulphur dioxide a sulphite stable at that temperature. In contradistinction to the prior proposal referred to above, I have found that the phenol can be produced by introducing steam directly into the mixture of sulphonate and base without the need of any preformation of phenate or any acidic dioxide gas to decompose a phenate, and that under these conditions the undesirably high temperatures of 425–500° C. are not required, a relatively low temperature of 370–420° C. giving excellent results.

According to the present invention, therefore, a process for the manufacture of phenols comprises preparing a solid mixture of a salt of the mono-sulphonic acid of the phenol desired and an inorganic base which is infusible at temperatures up to 420° C. and is capable of forming with sulphur dioxide a sulphite stable at such temperatures, and producing the phenol by subjecting the solid mixture to a temperature ranging from 370–420° C. while passing therethrough steam free from acidic gases.

The term "phenols" is used herein to denote simple hydroxyl-substituted aromatic or heterocyclic compounds which are free from other substituents and obtainable from the corresponding mono-sulphonates by exchanging the sulpho group for hydroxyl, and which, both in the form of the hydroxyl compounds and the corresponding sulphonates, do not readily decompose or lead to side reactions at the reaction temperature required for the present process. Among the more especially suitable phenols there may be mentioned the hydroxy-benzenes, hydroxy-naphthalenes and hydroxy-pyridines.

The passage of the steam through the solid mixture and the progress of the reaction are assisted by bringing the mixture into the form of solid agglomerated masses containing the sulphonic acid salt and the base in a state of very intimate contact. Thus, for example, if sodium benzene sulphonate is merely mixed in the form of a dry powder with dry calcium hydroxide, and the mixture is heated at 400° C. in a current of steam the liberation of phenol is somewhat slow. If, however, the reactants are more intimately admixed by first mixing them with a small amount of water to form a slurry, and evaporating the water sufficiently, while stirring, to produce a solid granular mass which will not soften on heating due to the presence of residual water, the rate of phenol formation is very much higher.

While the above method of bringing the reactants into a state of intimate contact by preparing a solid granular mass is the preferred method, it is to be understood that other methods may be used. For example, a moist mixture of the reactants may be pelleted or briquetted under pressure. In making up the mixture in granulated, pelleted or briquetted form a binding agent may be used, provided that it has no deleterious effect on the reaction.

In carrying out the process to make phenol itself by heating an intimate mixture of sodium benzene sulphonate and calcium hydroxide in a current of steam a temperature of about 400° C. is satisfactory, and at a temperature of 400–420° C. the rate of phenol formation is about 12 times greater than when the sulphonate is heated without calcium hydroxide.

It will be understood that the reaction should be conducted in the absence of air in order to prevent oxidation of the phenol produced, and the introduction of steam secures this object.

As the sulphonate there may be used the sulphonic acid salt of any metal forming a base which is as strong as or stronger than the base used for the reaction, for example, potassium, sodium, lithium, calcium, strontium, barium, magnesium, lead or zinc, or a mixture of sulphonates of different metals. The potassium salt is especially suitable. Thus, when a granulated mixture of potassium benzene sulphonate and calcium hydroxide prepared by evaporating a slurry of these reactants as described above is heated in a slow current of steam at 400° C. or somewhat over, so copius a formation of phenol occurs that the phenol separates from the condensate as an oily layer. In the case of some benzene sulphonates the speed of reaction in steam is increased when they are used in admixture with a benzene sulphonate of a different metal. For example, a mixture of the sodium and potassium sulphonates in equimolecular proportions reacts about 16 times faster at about 400° C. than the sodium sulphonate alone, and a mixture of 2 mols of the sodium sulphonate and 1 mol of the potassium sulphonate about 10 times faster. In some cases a mixture of the sulphonates of different metals reacts more rapidly than either of the sulphonates used alone. For example, a mixture of 1 equivalent of the sodium sulphonate with 1 equivalent of the barium sulphonate gives a more speedy reaction than either of these sulphonates used alone.

In the case of metal sulphonates which react more slowly than the potassium sulphonates the reaction may be accelerated by the presence of another substance, for example, a salt, which is otherwise inert. For example, the incorporation with a mixture of sodium benzene sulphonate and calcium hydroxide of potassium chloride, potassium sulphate or other potassium salt which is stable under the reaction conditions considerably increases the speed of reaction. Other substances which similarly accelerate the reaction are sodium chloride, borax, sodium hydroxide (in small quantities), zinc chloride or a mixture of barium carbonate and sodium chloride. Mixtures of sodium chloride with a potassium salt or with any of the other substances named above are also useful. By the use of such substances, especially a potassium salt, the speed of reaction in a current of steam can be made to approach that of the potassium sulphonate referred to above. Even a small addition of potassium chloride to the sodium sulphonate appreciably accelerates the reaction. The maximum acceleration appears to be obtained with 0.75 equivalent of potassium chloride, when the reaction is about 15 times faster than with the sodium sulphonate alone.

In addition to calcium hydroxide, which may be introduced in the form of calcium oxide, other suitable bases for reaction with the sulphonate are metal hydroxides, oxides or carbonates, for example, the hydroxides of barium, magnesium, lead, zinc or cadmium, and the carbonates of potassium, sodium, barium or calcium. There may also be mentioned trisodium phosphate, borax, sodium silicate or tricalcium silicate. If desired, a mixture of different bases may be used. In general any base capable of combining strongly with sulphur dioxide may be used, and the reaction will generally be more rapid the stronger the base. Especially rapid is the reaction between barium hydroxide and sodium benzene sulphonate in presence of sodium chloride, the speed of reaction being practically as rapid as in the case of the potassium sulphonate referred to above. A fairly good speed of reaction is also obtained in the case of the sodium sulphonate with barium carbonate in the presence of sodium chloride or with sodium carbonate alone. In general the proportion of the base in relation to the sulphonate need not exceed, or greatly exceed, the theoretical quantity, which is one equivalent of the base per molecular proportion of the sulphonate. However, when the proportion of the base used is at or near the theoretical quantity there is a greater tendency for side reactions to occur. In the case of calcium hydroxide an excess over the theoretical quantity has practically no effect on the reactivity of the mixture, and in practice it is advisable to use only a small excess, advantageously an excess of about 50 per cent., the total quantity of calcium hydroxide then amounting to about 30 per cent. of the weight of the sodium benzene sulphonate.

In order to reduce the risk of the formation of undesired products, it is advisable to prevent the reactants from coming into contact with catalytically active surfaces tending to promote decomposition of the products.

The rate at which the steam is introduced is not of critical importance, but in order to obtain the product in association with as little water as possible it is advisable not to introduce the steam at a rate higher than is required for satisfactory removal of the phenol. A higher rate than this has no advantageous effect on the speed of the reaction. In general a suitable rate is 400 grams of steam per hour per 100 grams of sulphonate, but it may vary widely without affecting the reaction, and in the case of a phenol which is not very readily volatilised it will be of advantage to introduce the steam at a somewhat higher rate.

The pressure of the steam in the reaction vessel may be below or above that of the atmosphere, but in general atmospheric pressure is most suitable. The pressure does not materially affect the reaction, except in certain cases. For example, some sulphonates have a tendency to swell and produce a frothy mass. This effect, which hinders the reaction can be counteracted by increasing the pressure of the steam.

The particular reaction temperature within the aforesaid range of 370–420° C. depends to some extent on the particular sulphonate and base used. In the case of sodium benzene sulphonate and calcium hydroxide practically no reaction occurs below about 400° C., but the reaction proceeds fairly rapidly at 410° C., which temperature is also suitable with most of the other mixtures referred to above. In the case of pyridine-$\beta$-sulphonate a somewhat lower temperature, for example 375–385° C., is satisfactory. It is generally advantageous to introduce the steam in a preheated condition so as to provide heat for the reaction.

Among the various methods of carrying out the process described above the preferred method is to heat in steam a mixture of a potassium sulphonate and calcium hydroxide or of a sodium sulphonate with potassium chloride and calcium hydroxide.

Although the speed of the reaction as measured by the rate of the formation of phenol in relation to the weight of unconverted sulphonate present at any time remains substantially constant throughout the reaction, it will be understood that the rate at which the phenol is produced in relation to the weight of the initial reaction mixture diminishes as the sulphonate is consumed. When about 90–95 per cent. of the sulphonate has reacted the rate of phenol production becomes too slow to be of practical value, and it is generally advisable not to proceed beyond the stage of a 90 per cent. conversion and to recover the unchanged sulphonate from the residue as hereinafter described. If the reaction is conducted as a continuous process by charging fresh reaction mixture into the reaction vessel and removing the reaction residue the initial high rate of phenol production can be substantially maintained.

The vapours issuing from the reaction vessel may be wholly condensed to form a mixture of the phenol and water or partially condensed to obtain the phenol in a more concentrated form. Phenol itself forms an azeotropic mixture with water containing approximately 9 per cent of phenol and boiling slightly below 100° C. In the case of phenol, therefore, partial condensation to obtain an enrichment in phenol is only useful when the ratio of water to phenol in the vapours is less than 10:1. With a substantially higher ratio of water to phenol partial condensation may be effected so as to obtain a secondary condensate containing approximately 9 per cent of phenol. In the case of some other phenols it is possible by partial condensation to obtain the phenol almost free from water. In other cases the phenol may be recovered from the concentrated phenol-water mixture in a substantially pure state by known methods, for example by simple distillation. When the phenol is only slightly soluble in water the separation may be performed by simple physical means and the separated phenol may be rectified by distillation. When the phenol is appreciably soluble in water it may be extracted by means of a suitable solvent and recovered in a substantially pure state from the extract solution by distillation.

If desired, the vapours issuing from the reaction vessel may be used to preheat to some extent the steam introduced into the vessel, the vapours being subsequently wholly or partially condensed as described above. Residual steam may be returned to the reaction vessel for re-use. Furthermore, the aqueous condensate, after separating the bulk of the phenol therefrom, may be used for generating steam required for the process, small residual quantities of the phenol being recovered either by being volatilised and so returned into the system or by being concentrated as a residue in the still. In the latter case an alkali hydroxide may be added to bind the phenol as phenolate, if desired.

The solid residue remaining in the reaction vessel may be treated in various ways. When calcium hydroxide is used as the base, the residue will generally contain alkali sulphite (containing the metal of the sulphonate), calcium sulphite, calcium hydroxide and unchanged alkali sulphonate, and also any reaction accelerator, such as a potassium salt, which may have been added.

It is desirable, especially when the reaction is not carried beyond the stage of a 90 per cent conversion, to treat the residue in order to recover the valuable constituents thereof, or, more advantageously, to convert the residue into a fresh reaction mixture, suitable for a further reaction. One method is to extract the residue with water, filter to remove the insoluble calcium compounds, treat the filtrate with sufficient fresh sulphonic acid to form alkali sulphonate, boil the solution to expel the sulphur dioxide produced by the reaction, add the necessary quantity of calcium hydroxide, and evaporate the whole to produce a solid granular mass providing a fresh batch of reaction mixture. The sulphur dioxide expelled may be recovered and used in any desired manner. For example, it may be used for the manufacture of sulphuric acid for making the sulphonic acid.

If the sulphonic acid used for preparing the sulphonate contains some sulphuric acid, the greater part of the latter may be removed by adding to the mixed solution sufficient calcium hydroxide, or, for example, recovered calcium sulphite to precipitate the sulphuric acid as calcium sulphate. The precipitated calcium sulphate need not be removed immediately, if only a small quantity of sulphuric acid is present, its removal being performed after the next reaction when the residue is extracted with water. If, on the other hand, the quantity of sulphuric acid present is appreciable the precipitated calcium sulphate is advantageously removed by filtration. In this case a second filtration to remove the precipitated calcium sulphate can be avoided by adding the sulphonic acid suitably diluted directly to the powdered reaction residue or to an aqueous slurry thereof. The sulphuric acid will thus be automatically removed, or at least prevented from accumulating, provided it is not present in excess of the equivalent quantity relatively to the calcium compounds in the reaction residue. The quantity of the sulphonic acid used will, of course, be proportional to the amount of decomposable alkali compounds present.

Should the fresh sulphonic acid only be available in the form of the calcium salt, when an alkali sulphonate is required for the reaction, the calcium sulphonate is added to the aqueous extract of the reaction residue in an amount sufficient to react with the alkali sulphite and alkali hydroxide present, the alkali hydroxide having been formed by reaction of a part of the alkali sulphite with calcium hydroxide during the extraction of the residue with water.

An alternative procedure is to separate the alkali sulphite from the aqueous extract of the reaction residue by crystallisation, and use the residual liquor containing unchanged sulphonate for making a fresh batch of reaction mixture. The separated alkali sulphite may be used for the independent manufacture of alkali sulphonate.

If, instead of calcium hydroxide, sodium carbonate, for example, is used as the base the reaction residue will be wholly soluble in water. The resulting sodium sulphite may be separated from the aqueous solution of the residue by crystallisation and used in part for the manufacture of fresh sulphonate, while the mother liquor is introduced into a fresh batch.

It will be evident from the above description that the only raw material consumed in the process, apart from the sulphonic acid, is the calcium hydroxide or similar base. The alkali combined with or added to the sulphonic acid can be wholly recovered.

Owing to the repeated working up of the reaction residue to form fresh reaction mixture the latter will become progressively contaminated with impurities. Thus, the whole of the residue may be discarded after a certain time, or the accumulation of impurities may be retarded by removing a small portion of the residue after each reaction. The material so discarded or removed may be treated in any suitable manner to recover any of the useful constituents, such as potassium salts.

The above description is mainly concerned with the manufacture of phenol from benzene sulphonates, but the invention is also applicable to other phenols of the kind hereinbefore defined, for example, α- or β-naphthol or β-hydroxy-pyridine, as illustrated in Examples 3, 4 and 5 below. In the case of α-naphthol, the sodium α-sulphonate mixed with calcium hydroxide and an addition of potassium chloride gives a smooth and rapid reaction at 400° C. with steam, and a yield of about 77-83 per cent. calculated on the sulphonate which reacts. The α-naphthol is volatilised by the steam. In the case of β-naphthol, the reaction of the sodium β-sulphonate with calcium hydroxide in the presence of potassium chloride and steam proceeds more slowly than with the sodium α-sulphonate, but the yield is somewhat better, amounting to about 85-90 per cent of the sulphonate which reacts. In the case of β-hydroxy-pyridine, the reaction of the potassium-β-sulphonate or the sodium-β-sulphonate (with the addition of potassium chloride) with calcium hydroxide is sufficiently rapid at a temperature of 370-385° C. but it is necessary to introduce the steam at a higher rate as the product is more difficult to volatilise.

The following examples illustrate the invention, the parts being by weight:

Example 1

30 parts of potassium chloride is added to a strong aqueous solution of 100 parts of sodium benzene sulphonate, and 30 parts of calcium hydroxide are added to the resulting solution. The whole is then evaporated with suitable agitation or stirring to produce an intimate mixture of the constituents in the form of a loose granular mass. The granular mass is charged into a reaction vessel in which it can be brought to a reaction temperature of 400-420° C., and a slow current of steam, preferably preheated to about 440° C., is passed through the mass. The steam is introduced at the rate of 400 parts per hour, and the rate of introduction is later reduced as the reactants are consumed. The vapours issuing from the reaction vessel are condensed to form a mixture of phenol and water which separates into two layers. The reaction is stopped when the rate of phenol formation has become very low. This occurs after heating for about 2½ hours, when about 90 per cent of the sulphonate will have reacted.

The phenol is recovered by extracting the phenol-water mixture with benzene, distilling the extract to remove and recover the benzene, and rectifying the residual phenol by distillation.

The solid residue which remains in the reaction vessel is discharged after cooling and extracted with sufficient hot water to dissolve all the alkali salts present. Before separating the aqueous extract by filtration sufficient benzene sulphonic acid is added to the mixture to produce 100 parts of sodium benzene sulphonate of which about 10 per cent constitutes the unchanged sulphonate left in the reaction vessel. The mixture is then boiled to expel the sulphur dioxide set free. Any sulphuric acid present in the benzene sulphonic acid introduced is for the most part precipitated as calcium sulphate by the calcium compounds present in the residue. The mixture is then filtered, and 30 parts of calcium hydroxide are added to the filtrate, which is then suitable for the preparation of a second batch of reaction mixture.

The quantity of phenol recovered depends on the extent of the conversion, but with a 90 per cent conversion approximately 45 parts of phenol are obtained representing a yield of about 96 per cent.

Although this example describes a batch process, it will be understood that by obvious modifications it can be carried out as a continuous process.

Example 2

27.5 parts of calcium hydroxide are added to a strong aqueous solution of 100 parts of potassium benzene sulphonate, and the mixture is converted into a solid granular mass and further treated as described in Example 1. The only difference from Example 1 is that the stage of 90 per cent conversion is reached after heating for about one hour at the reaction temperature.

The yield of phenol is approximately the same as that obtained in Example 1, and the treatment of the residue is the same.

Example 3

An aqueous solution of 100 parts of sodium naphthalene-α-sulphonate is mixed with 24 parts of potassium chloride and 24 parts of calcium hydroxide. The mixture is evaporated to produce a solid granular mass, and the latter is heated at 390-410° C. in a current of preheated steam. The issuing vapours are condensed to give a mixture of α-naphthol and water. After about 2 hours the reaction is about 90 per cent complete, and after cooling the solid residue is discharged from the reaction vessel.

The said residue is extracted with hot water, and treated with sufficient calcium naphthalene-α-sulphonate to produce, together with the unchanged sulphonate, 100 parts of sodium naphthalene-α-sulphonate. The whole is then filtered to remove the insoluble calcium compounds, and 24 parts of calcium hydroxide are added to the filtrate for preparing a fresh batch of reaction mixture.

The condensate is extracted with benzene, the extract is distilled to remove the benzene, and the crude α-naphthol is purified by fractional distillation under reduced pressure. Alternatively the condensate may be first treated with caustic soda solution to dissolve the α-naphthol, the insoluble matter separated from the solution, and the latter acidified and the precipitated naphthol collected. There are thus obtained approximately 45 parts of a product which may be further purified by distillation under reduced pressure.

Example 4

100 parts of sodium naphthalene-β-sulphonate, 24 parts of calcium hydroxide and 24 parts of potassium chloride are mixed with water to form a paste, and the latter is evaporated to produce a solid granular mass. The latter is heated at 390–410° C. in a current of steam. The issuing vapours are condensed to give a mixture of β-naphthol and water. After about 4 hours the reaction is about 90 per cent complete. The solid residue and the condensate are worked up as described in Example 3. Approximately 50 parts of crude β-naphthol are obtained which may be purified by distillation under reduced pressure.

*Example 5*

To an aqueous solution of 100 parts of sodium pyridine-β-sulphonate are added 30 parts of potassium chloride and 30 parts of calcium hydroxide. The mixture is evaporated, while stirring, to produce a solid granular mass. The granular mass is heated at a temperature of 375–385° C. in a current of steam which is passed through the mass at the rate of 1200 parts by weight per hour. The issuing vapour is partially condensed in a small packed tower in which the condensate scrubs the rising vapour and the uncondensed vapour is returned to the steam inlet of the reaction vessel. The condensation is so controlled that only about one tenth of the total steam is condensed and the remainder is returned to the reaction vessel. The hot condensate so obtained consists of a mixture of molten-β-hydroxy-pyridine and water which latter contains some of the β-hydroxy-pyridine in solution. The operation is continued until the quantity of β-hydroxy-pyridine present in the condensed vapor becomes insignificant, that is to say after about 4 hours. At the end of this period about 90–95 per cent of the sodium pyridine-β-sulphonate will have undergone reaction.

The water is removed from the aqueous condensate by distillation, and approximately 42 parts of crude β-hydroxy-pyridine remain behind. The crude product is purified by distillation to yield 38 parts of the purified product. About 2 parts of β-hydroxy-pyridine remain in the solid reaction residue and may be recovered therefrom by known methods, if desired.

I claim:

1. A process for the manufacture of phenols which comprises, preparing a solid mixture of a salt of the mono-sulphonic acid corresponding to the phenol desired and an inorganic base which is infusible at temperatures up to 420° C., and is capable of forming with sulphur dioxide a sulphite stable at such temperatures, and producing the phenol by subjecting the solid mixture to a temperature ranging from 370–420° C. while passing therethrough steam free from acidic gases.

2. A process for the manufacture of phenols which comprises, bringing a mixture of a salt of the mono-sulphonic acid corresponding to the phenol desired and an inorganic base, which is infusible at temperatures up to 420° C. and is capable of forming with sulphur dioxide a sulphite stable at such temperatures, into the form of solid agglomerated masses containing the said salt and base in a state of very intimate contact, and producing the phenol by subjecting the solid mixture to a temperature ranging from 370–420° C. while passing therethrough steam free from acidic gases.

3. A process for the manufacture of phenols which comprises, preparing a solid mixture of a salt of the mono-sulphonic acid corresponding to the phenol desired and calcium hydroxide, and producing the phenol by subjecting the solid mixture to a temperature ranging from 370–420° C. while passing therethrough steam free from acidic gases.

4. A process for the manufacture of phenols which comprises, preparing a solid mixture of a potassium salt of the mono-sulphonic acid corresponding to the phenol desired and an inorganic base which is infusible at temperatures up to 420° C. and is capable of forming with sulphur dioxide a sulphite stable at such temperatures, and producing the phenol by subjecting the solid mixture to a temperature ranging from 370–420° C. while passing therethrough steam free from acidic gases.

5. A process for the manufacture of phenols which comprises, preparing a solid mixture of a sodium salt of the mono-sulphonic acid of the phenol desired, an inorganic base which is infusible at temperatures up to 420° C. and is capable of forming with sulphur dioxide a sulphite stable at such temperatures, and a reaction accelerator selected from the group consisting of potassium chloride and potassium sulphate, and producing the phenol by subjecting the solid mixture to a temperature ranging from 370–420° C. while passing therethrough steam free from acidic gases.

DANIEL TYRER.